US010499020B1

(12) United States Patent
Santori et al.

(10) Patent No.: US 10,499,020 B1
(45) Date of Patent: Dec. 3, 2019

(54) LENSLET BASED SNAPSHOT HYPERSPECTRAL CAMERA

(71) Applicant: Verily Life Sciences LLC, Mountain View, CA (US)

(72) Inventors: Charles M. Santori, Palo Alto, CA (US); Seung Ah Lee, San Francisco, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 39 days.

(21) Appl. No.: 15/680,050

(22) Filed: Aug. 17, 2017

(51) Int. Cl.
| | |
|---|---|
| *H04N 5/335* | (2011.01) |
| *H04N 9/083* | (2006.01) |
| *G02B 3/00* | (2006.01) |
| *G02B 21/02* | (2006.01) |
| *G02B 21/16* | (2006.01) |
| *G02B 21/36* | (2006.01) |

(52) U.S. Cl.
CPC ........... *H04N 9/083* (2013.01); *G02B 3/0056* (2013.01); *G02B 21/025* (2013.01); *G02B 21/16* (2013.01); *G02B 21/361* (2013.01)

(58) Field of Classification Search
CPC ...................................................... H04N 9/083
USPC ........................................................ 348/277
See application file for complete search history.

(56) References Cited

U.S. PATENT DOCUMENTS

| | | | |
|---|---|---|---|
| 8,233,148 B2 | 7/2012 | Bodkin et al. | |
| 9,313,393 B2 | 4/2016 | Olsen et al. | |
| 9,395,293 B1 | 7/2016 | Acosta et al. | |
| 2002/0135825 A1* | 9/2002 | Lee | G02B 5/1814 358/509 |
| 2007/0279535 A1* | 12/2007 | Fiolka | G03F 7/70075 348/744 |
| 2008/0291445 A1* | 11/2008 | Iwane | G01J 3/0262 356/328 |
| 2009/0021598 A1 | 1/2009 | McLean et al. | |
| 2010/0284092 A1* | 11/2010 | Hayakawa | G02B 15/173 359/683 |

(Continued)

OTHER PUBLICATIONS

Bodkin, A., et al., "Video-Rate Chemical Identification and Visualization With Snapshot Hyperspectral Imaging," Proceedings of the SPIE 8374:83740C, Jun. 2012, 13 pages.

(Continued)

*Primary Examiner* — Usman A Khan
(74) *Attorney, Agent, or Firm* — Christensen O'Connor Johnson Kindness PLLC

(57) ABSTRACT

A hyperspectral camera system includes an input optical assembly, a lenslet array, a dispersion element, and an image sensor. The input optical assembly magnifies an image of a sample onto an image plane. The lenslet array is positioned approximately at the image plane and includes a 2D array of microlenses that concentrate the image into an array of image portions. Each of the image portions has a smaller area than a corresponding one of the microlenses and the image portions are at least partially separated from each other by interstitial regions. The dispersion element is disposed in the optical path of the image to spatially disperse spectral components in each of the image portions to generate spectrum stripes that spatially spread different spectral components of the image sourced from a single sample location within the sample. The image sensor captures a snapshot image of the spectrum stripes.

25 Claims, 7 Drawing Sheets

(56) References Cited

U.S. PATENT DOCUMENTS

| | | | |
|---|---|---|---|
| 2012/0215456 A1* | 8/2012 | Hoffnagle | G01N 15/147 |
| | | | 702/19 |
| 2015/0234102 A1 | 8/2015 | Kurzweg et al. | |
| 2015/0281538 A1* | 10/2015 | Boettiger | H04N 5/2258 |
| | | | 348/218.1 |
| 2016/0313181 A1 | 10/2016 | Golub et al. | |

OTHER PUBLICATIONS

Feng, Z., et al., "Multispectral Imaging of T and B Cells in Murine Spleen and Tumor," Journal of Immunology 196(9):3943-3950, May 2016.
"Hyperspectral Imaging: 2015 Activity Update," IMEC, Leuven, Belgium, Dec. 2015, 47 pages.
"IMEC Hyperspectral Line-Scan Evaluation System," IMEC, Leuven, Belgium, ©2013, 2 pages.
Jahr, W., et al., "Hyperspectral Light Sheet Microscopy," Nature Communications 6:7990, Sep. 2015, 7 pages.
Kester, R.T., et al., "Image Mapping Spectrometry—A Novel Hyperspectral Platform for Rapid Snapshot Imaging," Proceedings of the SPIE 8048:80480J, Jun. 2011, 6 pages.
Lavagnino, Z., et al., "Snapshot Hyperspectral Light-Sheet Imaging of Signal Transduction in Live Pancreatic Islets," Biophysical Journal 111(2):409-41 7, Jul. 2016.
Overton, G., "Hyperspectral Imaging: One-Shot Camera Obtains Simultaneous Hyperspectral Data," Laser Focus World, Mar. 3, 2017 <http://www.laserfocusworld.com/articles/print/volume-47/issue-3/world-news/hyperspectral-imaging-one-shot-camera-obtains-simultaneous-hyperspectral-data.html> [retrieved Mar. 3, 2017], 2 pages.
"Snapshot Mosaic Hyperspectral Imaging Camera," IMEC, Leuven, Belgium, published prior to Aug. 17, 2017, 2 pages.

* cited by examiner

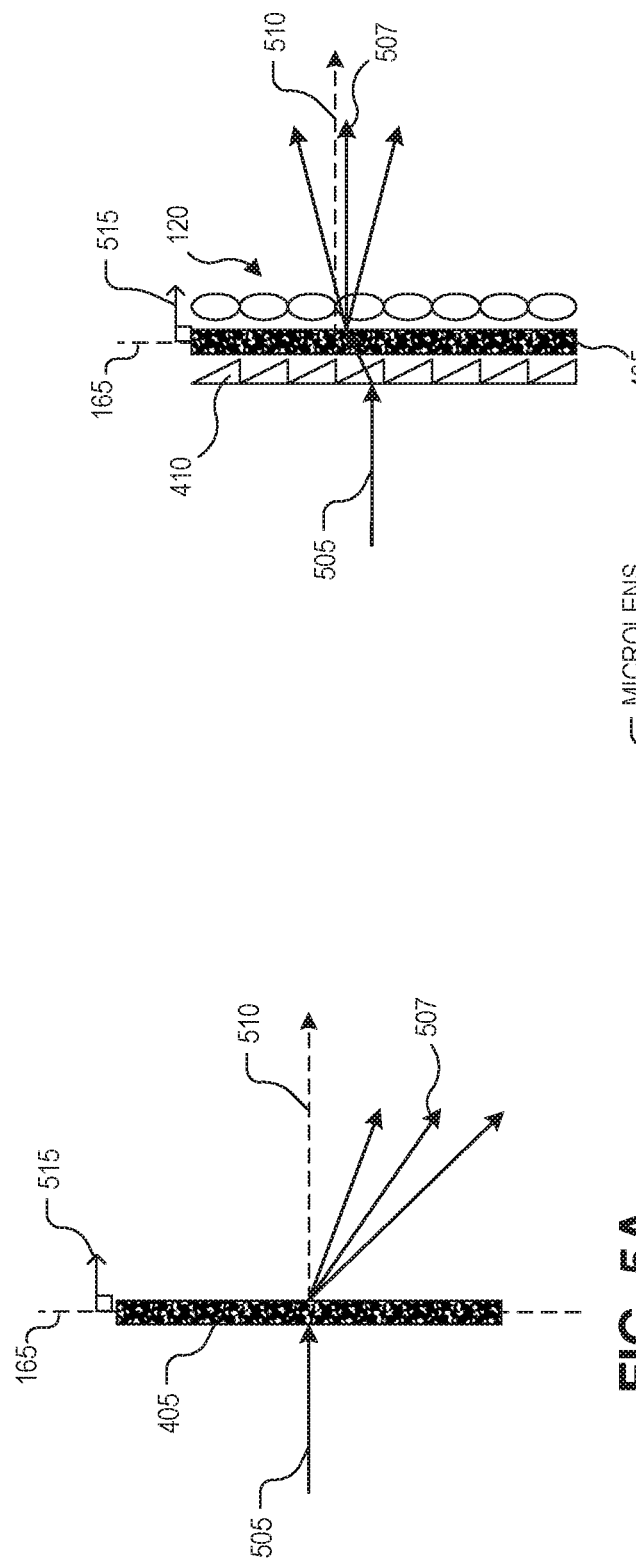
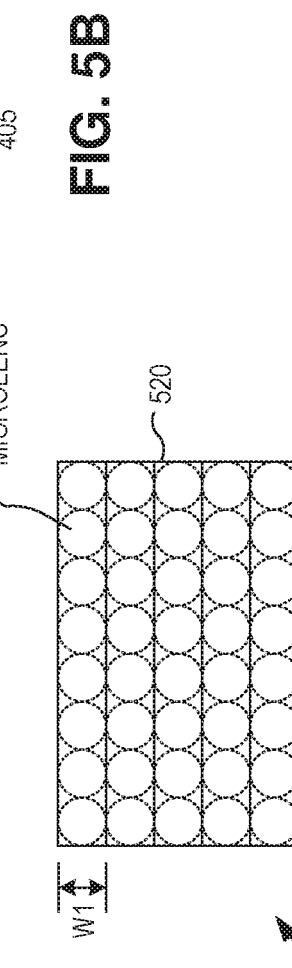
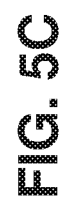
FIG. 5A
FIG. 5B
FIG. 5C

LENSLET BASED SNAPSHOT HYPERSPECTRAL CAMERA

TECHNICAL FIELD

This disclosure relates generally to camera systems, and in particular, relates to hyperspectral camera systems.

BACKGROUND INFORMATION

A hyperspectral image is a dataset that contains spatial information along two axes (similar to a conventional image) but also includes a large number of wavelength channels, in contrast to a conventional image, which typically has only one to three color channels. Hyperspectral images may contain useful information about spatially varying molecular content, and can also be used for multiplexed detection of fluorescent labels. A problem with most hyperspectral imaging hardware implementations is that the data collection tends to be slow, typically requiring some type of scanning across one of the spatial axes or along the wavelength axis. This can be a limitation for capturing rapid dynamics or motion, for example, in imaging flow cytometry, or studies of cell signaling dynamics or protein diffusion. Another limitation in some schemes involving fluorescence detection is that many of the emitted photons are not detected, potentially leading to problems with photobleaching of the sample before an adequate signal has been collected.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 5A illustrates how a diffraction grating obliquely disperses light, in accordance with an embodiment of the disclosure.

FIG. 5B illustrates how a prism array pre-bends light to normalize a design wavelength dispersed by the diffraction grating, in accordance with an embodiment of the disclosure.

FIG. 5C is a plan view illustration of a prism array for pre-bending light, in accordance with an embodiment of the disclosure.

DETAILED DESCRIPTION

Embodiments of an apparatus, system, and method of operation for a snapshot hyperspectral camera system using a lenslet array are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the snapshot hyperspectral imaging scheme described herein acquire an entire hyperspectral image in a single camera exposure, without requiring moving parts, and without intentionally discarding light collected by the optical components. This snapshot hyperspectral imaging scheme may be useful in applications, such as flow cytometry, that require a rapid exposure over a field of view (FOV) of a sample.

Figure 1:
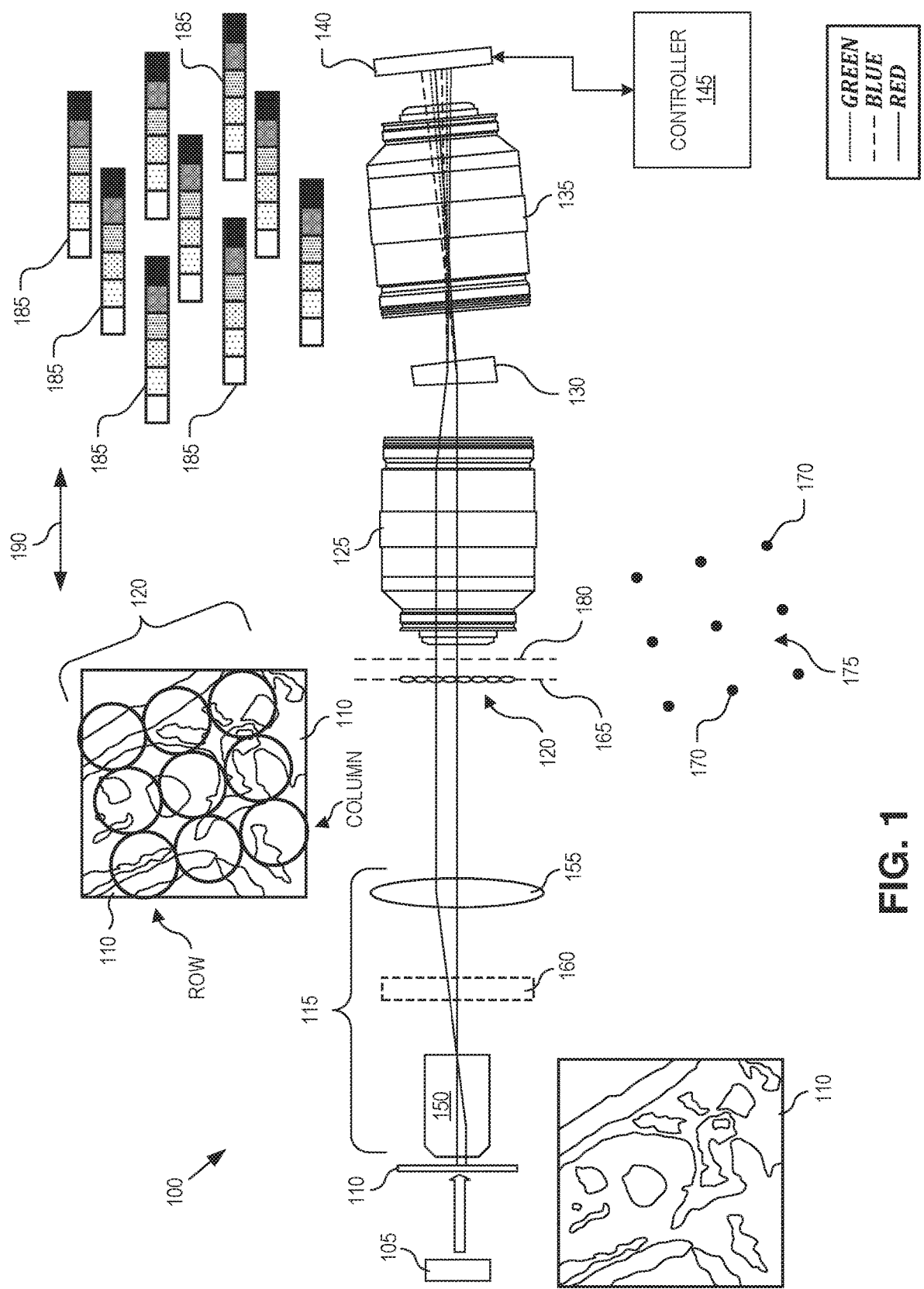
FIG. 1 is a diagram illustrating components of a snapshot hyperspectral camera system, in accordance with an embodiment of the disclosure.

FIG. 1 is a diagram illustrating components of a snapshot hyperspectral camera system 100, in accordance with an embodiment of the disclosure. The illustrated embodiment of system 100 includes a light source 105 for illuminating a sample 110, an input optical assembly 115, a lenslet array 120, a collimating lens assembly 125, a dispersion element 130, a focusing lens assembly 135, an image sensor 140, and a controller 145. The illustrated embodiment of input optical assembly 115 includes an objective lens 150, a focusing lens 155, and a wavelength filter 160.

In one embodiment, objective lens 150 is a microscope objective that images and magnifies sample 110. In the illustrated embodiment, sample 110 is illuminated through its back side; however, other illumination schemes, such as front or side illumination, may be used. In fluorescence mode, light source 105 may be a short-wavelength excitation laser, and the resulting fluorescence is filtered by a long-pass or band-pass filter 160 positioned between objective lens 150 and focusing lens 155. In some embodiments, objective lens 150 is an infinity-corrected objective, allowing focusing lens 155 to form an image onto lenslet array 120. In one embodiment, focusing lens 155 is a long focal length tube lens (e.g., a 300 mm focal length achromatic doublet). Lenslet array 120 is positioned approximately at the image plane 165 of input optical assembly 115 and focusing lens 155.

Lenslet array 120 includes a two-dimensional (2D) array of microlenses and operates to concentrate the image of sample 110 into an array of image portions 170. Each image portion 170 has a smaller area than a corresponding one of the microlenses within lenslet array 120. Each image portion 170 is at least partially separated from each other by interstitial regions 175. The interstitial regions 175 provide space for spatially dispersing different spectral components within each image portion 170.

Figure 3A:
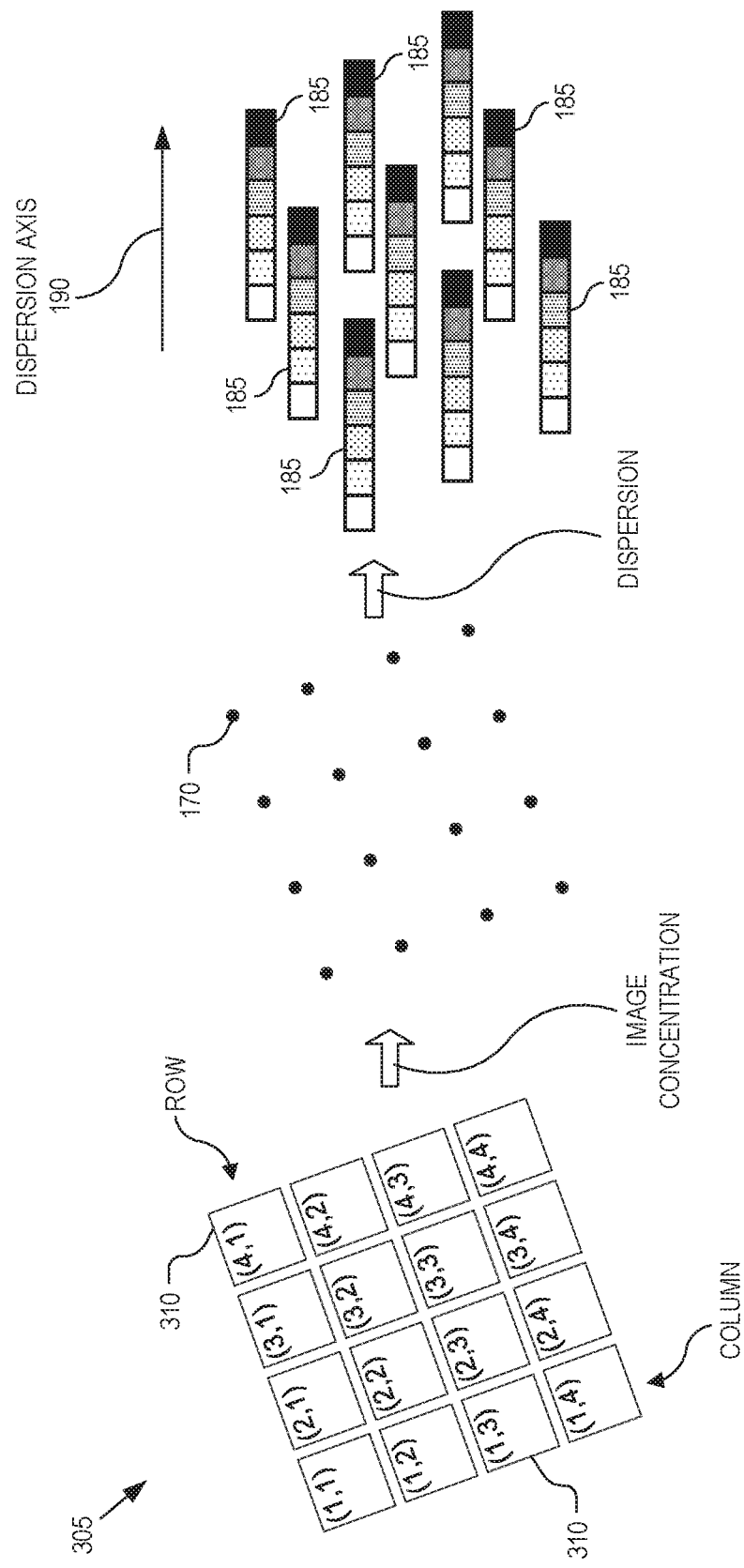
FIG. 3A illustrates a lenslet array including a two-dimensional (2D) array of microlenses where each microlens has a square perimeter shape and the dispersion axis is oblique relative to columns and row of the 2D array of microlenses, in accordance with an embodiment of the disclosure.

The pitch of lenslet array 120 is chosen based on a desired spectral resolution. The focal ratio of the microlenses within lenslet array 120 is chosen based on the limitations of the downstream optical relay system, which in FIG. 1 includes collimating lens 125, dispersion element 130, and focusing lens 135. For example, in one embodiment, the microlenses of lenslet array 120 are separated center-to-center with a 100 micron pitch and have an f/8 focal ratio. In one embodiment, the microlenses may have a circular perimeter shape (illustrated in FIG. 1) or other perimeter shapes. For example, FIG. 3A illustrates a lenslet array 305 having a square lattice or square perimeter shapes for microlenses 310, and a fill factor close to 100% (e.g., no gaps between adjacent microlenses). Thus the perimeter shape or boundary of each microlens 310 is square or rectangular, even though the surface is spherical (or nearly spherical-aspheric shapes may be used to improve the focusing and achieve a diffraction-limited point-spread function). Other lattice geometries and perimeter shapes are possible.

In one embodiment, the overall magnification of input optical assembly 115 is chosen so that a diffraction-limited spot at image plane 165 is approximately the same size as a single microlens within lenslet array 120. In other embodiments, the microlenses of the 2D array of microlenses within lenslet array 120 each have a size that ranges between one quarter and four times of the diffraction limited spot size of the input optical assembly 115. If the magnification of input optical assembly 115 is too large, the signal becomes weaker, and the information density is decreased because adjacent microlenses receive redundant spatial information. If the magnification is too small, the spectral resolution is degraded, and the spectral response may become coupled to spatial nonuniformities of sample 110. In one embodiment, the nominal magnification of objective lens 150 is approximately 100× and the focal length of focusing lens 155 is approximately 1.7 times longer than it is for standard tube lenses for a total magnification of input optical assembly 115 of approximately 170×. Other total magnification factors may be implemented.

Lenslet array 120 concentrates the light of the sample image incident on image plane 165 onto focal plane 180 as image portions 170. Image portions 170 have a smaller size (e.g., diameter) than the pitch of lenslet array 120. Image portions 170 are then re-collimated using collimating lens assembly 125. In the illustrated embodiment, the focal plane of collimating lens assembly 125 is approximately aligned with (e.g., co-incident with) the focal plane 180 of lenslet array 120. In one embodiment, collimating lens assembly 125 is a camera lens assembly (e.g., Zeiss Apo Sonnar T* 2/135 mm lens).

Dispersion element 130 is positioned between collimating lens assembly 125 and focusing lens assembly 135 to disperse the collimated image light of the concentrated image portions 170 according to wavelength. In the illustrated embodiment, dispersion element 130 is a wedge prism, though other dispersion elements may be used (e.g., a non-deviating design such as a double-Amici prism, diffraction grating, etc.). Dispersion element 130 spatially disperses different spectral components in each image portion 170 to generate spectrum stripes 185 that spatially spread the different spectral components of the image sourced from a single sample location within sample 110.

Finally, the image light is then refocused onto image sensor 140 by focusing lens assembly 135 (e.g., 135 mm camera lens) and output to controller 145. A large image sensor is suitable for obtaining simultaneously a large number of spatial pixels and a large number of spectral channels in a snapshot image. In one embodiment, a de-Bayered (color filters removed from the sensor) 50 Mp sensor is used.

The illustrated embodiment of system 100 includes lenslet array 120 rotated (i.e., obliquely orientated) relative to a dispersion axis 190 of dispersion element 130. In other words, dispersion element 130 is orientated to cause dispersion along dispersion axis 190 (e.g., horizontal dispersion axis) where columns and row of the 2D array of microlenses within lenslet array 120 are obliquely rotated relative to dispersion axis 190. In one embodiment, the columns and rows of the image pixels within image sensor 140 are also oblique to the columns and rows of lenslet array 120 while dispersion axis 190 of dispersion element 130 is aligned parallel with either rows or columns of image sensor 140. Lenslet array 120 is rotated to a chosen angle to avoid overlap between spectrum stripes 185 sourced from adjacent microlenses. This angle, along with the magnitude of dispersion, is chosen to improve the fill factor of image sensor 140, while reducing mixing of signals from each sample location. A larger angle gives cleaner vertical separation between light from adjacent microlens columns, but also decreases the allowed dispersion before the light overlaps with spectrum stripes 185 sourced from the adjacent microlens rows.

Figure 2:
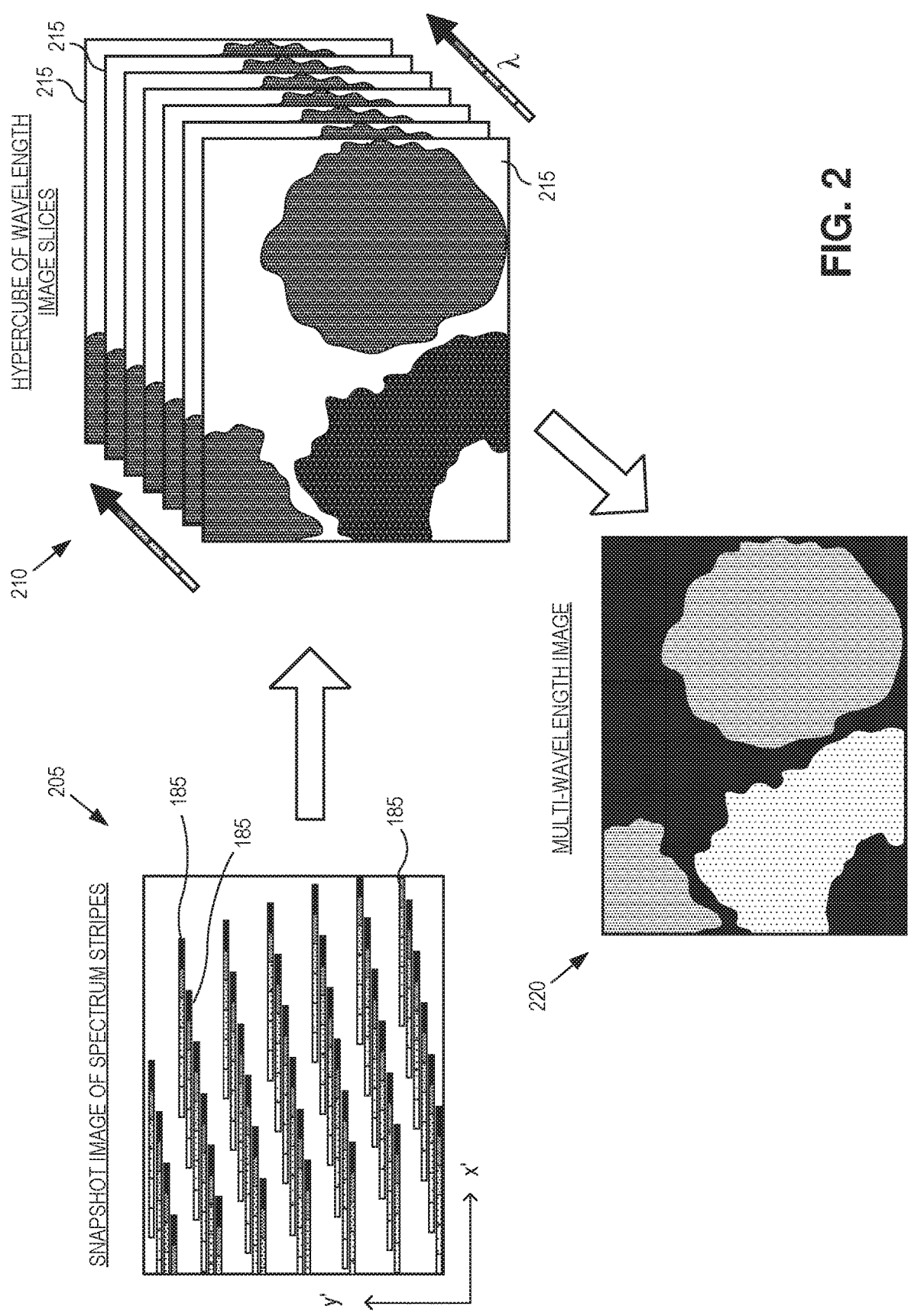
FIG. 2 illustrates an image reconstruction process where a snapshot image of spectrum stripes is transformed into a hypercube of wavelength image slices and then into a multi-wavelength image, in accordance with an embodiment of the disclosure.

FIG. 2 illustrates an image reconstruction process where the sample image is transformed from a snapshot image 205 of spectrum stripes 185 into a hypercube 210 of wavelength image slices 215, and then into a multi-wavelength image 220, in accordance with an embodiment of the disclosure. Snapshot image 205, hypercube 210, wavelength image slices 215, and multi-wavelength image 220 all represent images of sample 110. Converting the raw snapshot image 205 into the other image formats (referred to as image reconstruction) includes an interpolation that connects an (x, y, λ) (where λ represents wavelength) point in sample 110 to an (x', y') point on the raw snapshot image 205. Here x, y corresponds to the spatial coordinate in the sample plane (and lenslet plane) and (x', y') corresponds to the pixel coordinates on image sensor 140. In some embodiments, (x', y') correspond to sub-pixel accuracy on the image sensor plane.

One possible reconstruction technique includes collecting a set of calibration images with uniform illumination of known discrete wavelengths. A raw calibration image will have an array of bright spots, each corresponding to a single microlens within lenslet array 120 and a discrete wavelength. For each discrete wavelength in the calibration dataset, a list of centroid positions of the bright spots is calculated, which are then organized into 2D grids. Depending on the optical components, the bright spots on image sensor 140 may be distorted, thus distance-based sorting algorithms may be used to map the bright spots into a square lattice array (x,y). Upon reconstruction, the two 3D matrices of spot positions (x'(x,y,λ) and y'(x,y,λ)) for the discrete set of calibration wavelengths are analyzed along the wavelength axis to get expected positions in the raw image (x', y') for any wavelength. Pixel intensity values in the raw snapshot image 205 can be analyzed and reorganized based on the interpolated calibration matrices into hypercube 210 (I(x',y') to I(x, y, λ)). During this process, multiple rows (parallel to the dispersion axis) in the raw snapshot image 205 can be summed to account for the large spot sizes and to increase the signal-to-background ratio. The vertical separation between the spectrum stripes 185 should be considered in order to avoid crosstalk between horizontally adjacent microlenses within lenslet array 120. In addition, to account for other aberrations such as axial chromatic aberration (defocusing), wavelength-dependent quantum efficiency and transmission efficiency variations, and lens shading effects, the intensities and spot sizes from the calibration data can also be used to normalize the raw data. The calibration data only needs to be taken once, or at prespecified intervals. If there is possible lateral drift in the system, reference points in the raw image can be used to adjust the calibration. For example, known wavelength peaks in spectrum stripes 185, or excitation/illumination light can be used as a reference. In the last case, some of the excitation light would be allowed to reach image sensor 140, to use this wavelength component for reference in the calibration and also to reconstruct a bright-field image.

Accordingly, once all (x', y') positions in snapshot image 205 have been correlated to a given wavelength, individual wavelength image slices 215 can be assembled with a group of wavelength image slices 215 from a given snapshot image 205 forming hypercube 210. Subsequently, various combinations of the wavelength image slices 215 can be combined to form different multi-wavelength images 220. For example, weighted combinations, linear combinations, non-linear combinations, or segmented images can be combined to generate different multi-wavelength images 220 that emphasize or focus on different natural phenomena or spectral components.

The possibility of cross-talk between adjacent spectrum stripes 185 limits the efficiency with which the area of image sensor 140 can be filled. Due to the rotation of lenslet array 120, vertically adjacent spectrum stripes 185 are shifted horizontally relative to each other, so that any mixing of nearby or adjacent spectrum stripes 185 can produce false spectral features. Besides maintaining a large vertical separation, there are other possible improvements that can allow the spacing between spectrum stripes 185 to be decreased while keeping the effects of cross-talk at an acceptable level.

Figure 3B:
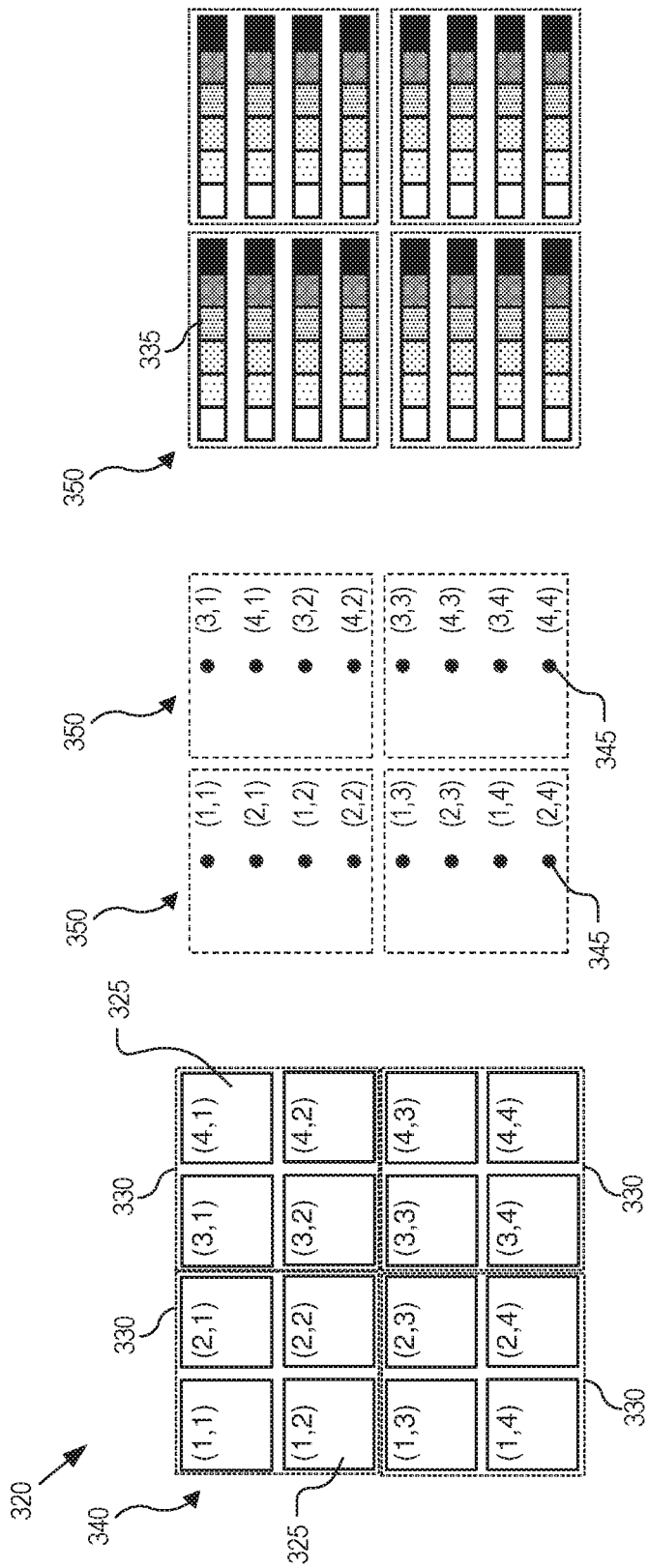
FIG. 3B illustrates a lenslet array including a subgroup of microlenses that repeats across the lenslet array and uses off-axis lensing to rearrange a layout pattern of the spectrum stripes on the image sensor, in accordance with an embodiment of the disclosure.

One approach for reducing the harmful effects of cross-talk is to change the design of lenslet array 120. FIG. 3B illustrates a lenslet array 320 including microlenses 325 having square perimeter shapes, in accordance with an embodiment of the disclosure. Lenslet array 320 is not rotated similar to lenslet arrays 120 or 305 (though it can be). However, lenslet array 320 includes a subgroup 330 of microlenses 325 that repeats across lenslet array 320 and uses off-axis lensing of one or more of the microlenses 325 within the subgroup 330 to rearrange a layout pattern of spectrum stripes 335 on the image sensor. In the illustrated embodiment, microlenses 325 of each subgroup 330 are organized into a first layout pattern 340 that is a 2×2 block array. However, off-axis lensing of one or more of microlenses 325 reorganizes the concentrated image portions 345 and spectrum stripes 335 into a second layout pattern 350 (e.g., vertical line) that is different than the first layout pattern 340.

Square microlenses 325 can be desirable, due to their near 100% fill factor. However, by not requiring all of the microlenses with the 2D array of microlenses to be identical in their focusing properties, the collected light can be focused into layout patterns that are aligned so that, after dispersion, the wavelength positions of adjacent spectrum stripes 335 match. For this type of arrangement, cross-talk introduces fewer false spectral features into adjacent spectrum stripes 335. As mentioned, this pattern reorganization can be achieved by designing the curvature of some of microlenses 325 to focus off-axis. While FIG. 3B illustrates a repeating subgroup 330 that is a 2×2 block array, other block arrays may be implemented. Generally, as the desired number of spectral channels (and hence the length of spectrum stripes 335) increases, the number of microlenses 325 per subgroup 330 will increase to maintain a high efficiency for filling image sensor 140. For example, a 3×3 or 4×4 pattern layout may be chosen instead. It should also be noted that this alternative scheme not only uses custom microlens designs for off-axis lensing, but may also increases the total range of angles for rays exiting the lenslet array 320, which may require downstream optics to have larger acceptance angles.

Related to the problem of cross-talk between vertically adjacent spectrum stripes, cross-talk between horizontally adjacent spectrum stripes is also possible if the spectral bandwidth of the collected light causes the length of each spectrum stripe on the image sensor 140 to exceed the horizontal separation, causing a spectral "wrap-around" effect. Besides increasing the pitch or spacing of the lenslet array or decreasing the amount of dispersion, this overlap can also be avoided by including a bandpass, long-pass, or short-pass filter (e.g., wavelength filter 160) in the optical path. Alternatively, an algorithm may be used to separate the two spectrum stripes, in some cases. To achieve this, it may be advantageous if the overlapping spectrum stripes have some detectable difference in vertical width or position.

Other approaches for reducing the harmful effects of cross-talk can be achieved via post processing using controller 145. In one embodiment, an iterative approach is used. First, initial spectral functions describing spectral content for each spectrum stripe is generated. Then, cross-talk coefficients are applied to the initial spectral functions to offset cross-talk from adjacent spectrum stripes for each of the spectrum stripes. The cross-talk coefficients are pre-calibrated values for amplitude and shift (e.g., horizontal shift of spectrum stripes due to rotation of the lenslet array) of cross-talk between adjacent spectrum stripes. Revised spectral functions for the spectrum stripes are generated after applying the cross-talk coefficients. The application of the cross-talk coefficients and generation of the revised spectral functions are iterated to generate a refined hyperspectral image of sample 110 with reduced cross-talk.

Yet another post processing embodiment includes a sharpening and/or deconvolution procedure performed on the raw snapshot image 205. In this embodiment, one or more cross-talk correction matrices for each spectrum stripe 185 are generated. The correction matrices include coefficients for offsetting cross-talk contributions from adjacent spectrum stripes 185. The cross-talk correction matrices are then applied to each spectrum stripe 185 to generate a refined hyperspectral image of sample 110 with reduced cross-talk. Each cross-talk correction matrix may be a spatially varying interpolation matrix that includes both positive and negative values and may be tailored to the position of each spectrum stripe 185 relative to discrete sensor pixels within image sensor 140. For example, such an interpolation matrix may have a large positive value in the center, a small negative value centered on vertically adjacent spectrum stripes (which serves to estimate and subtract the contribution from this immediate neighbor), and a smaller, positive value centered on the next-nearest-neighbor spectrum stripe (to correct for an overestimate of the cross-talk), etc. Although a different interpolation matrix may be required at each position, each cross-talk correction matrix is likely to be small, and thus would not impose impractical memory or computational requirements. In one embodiment, the cross-talk correction matrix at each position may be generated on-the-fly during the computation using a polynomial.

System 100 described above provides a high detection efficiency, which is desirable for laboratory instrumentation where performance is often more important than size and cost. However, a more compact embodiment may be achieved with adjustments to, or elimination of, the relay optical system including collimating lens 125 and focusing lens 135.

Figure 4:
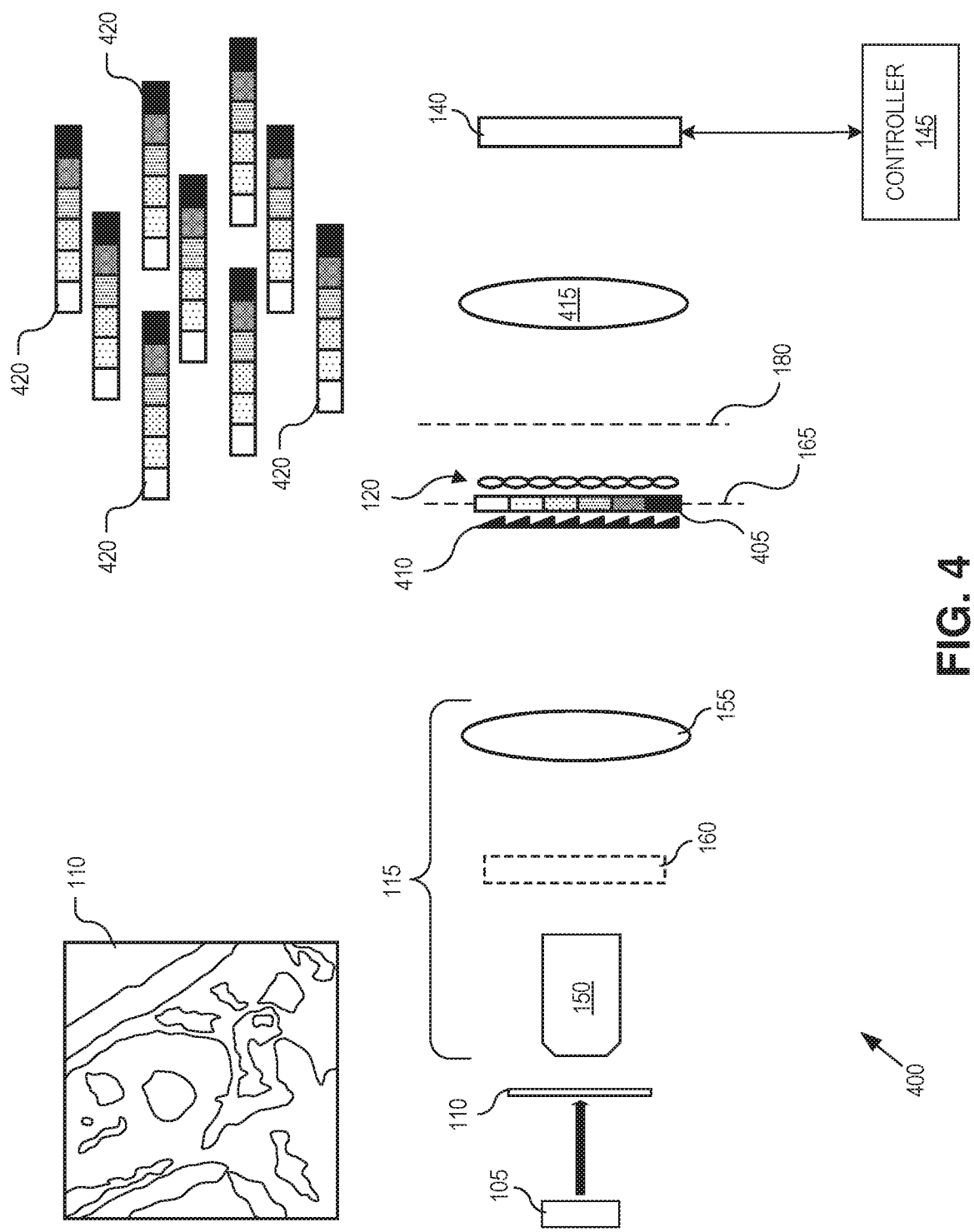
FIG. 4 is a diagram illustrating components of a snapshot hyperspectral camera system that uses a diffraction grating as the dispersion element, in accordance with an embodiment of the disclosure.

FIG. 4 is a diagram illustrating a snapshot hyperspectral camera system 400 that uses a diffraction grating 405 as the dispersion element, in accordance with an embodiment of the disclosure. System 400 operates in a similar manner as described above in connection with system 100 and includes many similar components including light source 105, input optical assembly 115, image sensor 140, and controller 145. However, system 400 also includes a diffraction grating 405 to provide the spectral dispersion, a prism array 410 to pre-bend image light prior to dispersion by diffraction grating 405, and a focusing lens 415 having a focal plane that substantially aligns to a focal plane of lenslet array 120.

Prism array 410 is disposed between input optical assembly 115 and diffraction grating 405. Prism array 410 pre-bends image light output from input optical assembly 115 by an angle such that a design wavelength dispersed by diffraction grating 405 is output from lenslet array 120 along a trajectory that is substantially normal to the image plane 165. FIGS. 5A and 5B illustrate this pre-bending technique for normalizing the trajectory of a design wavelength. As illustrated in FIG. 5A, diffraction grating 405 alone disperses image light 505 such that the design wavelength of diffraction grating 405 is dispersed along a trajectory 507 that is oblique to the zero order path 510 and the normal 515 to the image plane 165.

In contrast, FIG. 5B illustrates how prism array 410 pre-bends image light 505 by an angle such that design wavelength 507 dispersed by diffraction grating 405 is output to lenslet array 120 along a trajectory that is substantially normal to image plane 165 (parallel to normal 515). Thus, diffraction grating 405 produces a strong dispersion, but for a particular design wavelength the bending angle is canceled by prism array 410. In one embodiment, prism array 410 is a large plastic film, often used with light guides for liquid crystal display backlights. Thus, typical rays of image light 505 enter the microlenses of lenslet array 120 near normal incidence, reducing the astigmatism that would occur with a diffraction grating alone. A further benefit of prism array 410 is that the rays enter the downstream optics close to normal incidence, reducing aberrations and other losses. It should be noted that many image sensors have a small acceptance angle, because they rely on microlenses to concentrate light to the active area within each pixel.

FIG. 5C illustrates a plan view of prism array 410. In the illustrated embodiment, prism array 410 is a one-dimensional (1D) array of prism 520 with each prism 520 aligned parallel to a line of microlenses within the 2D array of microlenses of lenslet array 120. In various embodiments, each prism 520 has a width that is an integer multiple of the width W1 of the microlenses and the interfaces between each elongated prism 520 are offset relative to the interfaces between a line (e.g., row) of microlenses so that a ray passing through the center of a prism facet will also pass through the center of a microlens. This arrangement reduces interference of light passing through different facets of the prism array and entering the same microlens. In other embodiments, prism array 410 may be aligned to the grooves of the diffraction grating, and together they may be rotated relative to the axes of lenslet array 120. The facets of the diffraction grating may be shaped ("blazed") to maximize the efficiency of light diffracted into a first order.

In other embodiments, the order of prism array 410, diffraction grating 405, and lenslet array 120 may be interchanged for ease of assembly, to reduce reflection losses, or to reduce focusing aberrations. In other embodiments, functionality may be combined into a reduced number of components. For example, a single optical component may contain prism facets on one side and diffractive grooves on the other side. Alternatively, the prism array may incorporate diffractive grooves into the prism facets. In that case it is possible to incorporate the lenslet array on the back side of the same component. Thus, a single optical component can combine the functionality one, two, or all three of the prism array, the diffraction grating, and/or the lenslet array.

Returning to FIG. 4, the image light incident upon lenslet array 120 is already dispersed as such the image light concentrated by lenslet array 120 forms spectrum stripes 420 at focal plane 180. Focusing lens 415 has its focal plane aligned with the focal plane 180 of lenslet array 120 to reimage spectrum stripes 420 onto image sensor 140. It is noteworthy that the image light incident across a single microlens of lenslet array 120 is effectively collimated light due to the small size of the microlenses (e.g., 100 μm diameter) when considered in combination with the large magnification of input optical assembly 115, which generates a correspondingly small angular divergence of output rays. Accordingly, diffraction grating 405 is effectively dispersing near collimated light, similar to the embodiment of FIG. 1.

Figure 6:
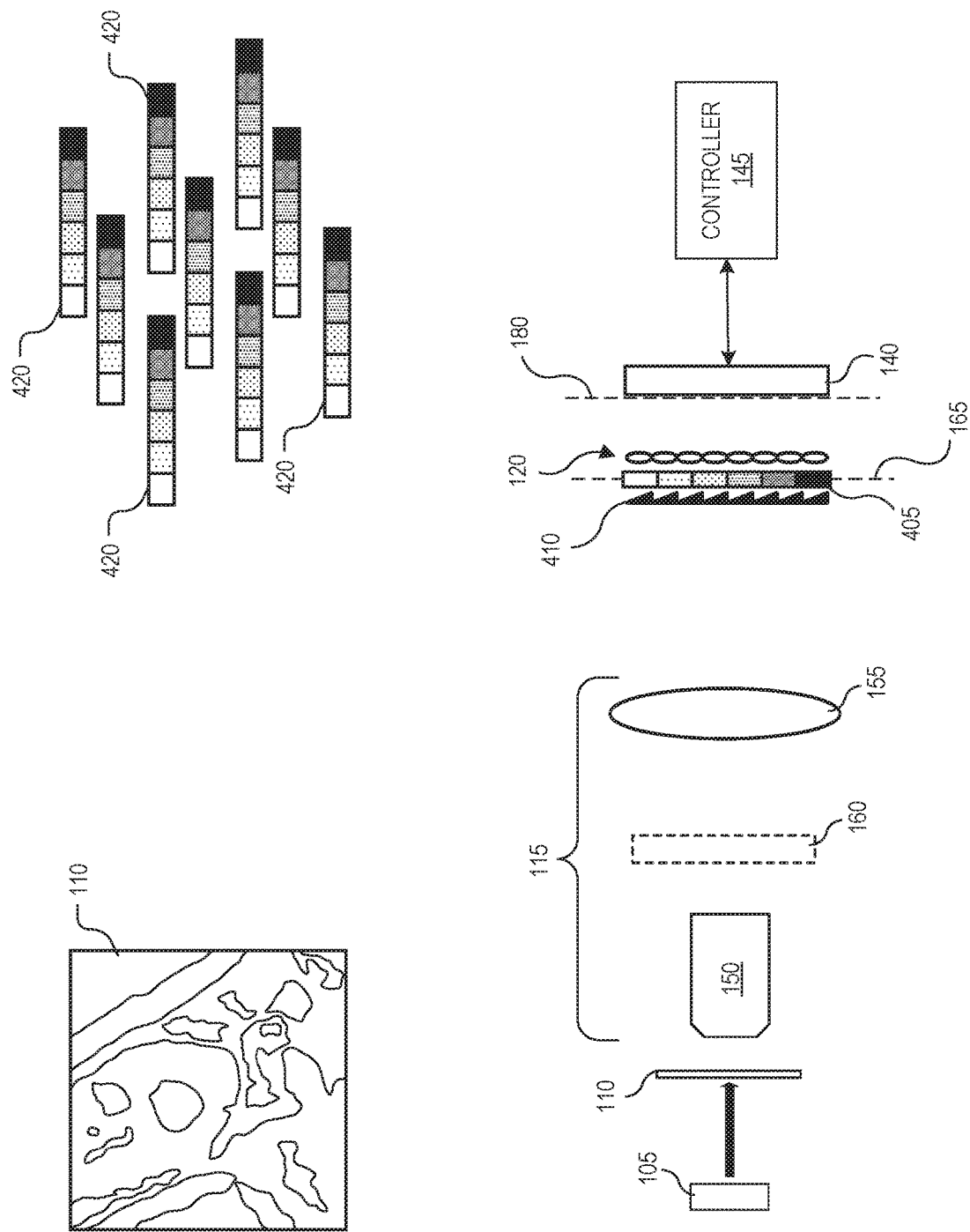
FIG. 6 is a diagram illustrating a snapshot hyperspectral camera system that also uses a diffraction grating as the dispersion element, in accordance with another embodiment of the disclosure.

FIG. 6 is a diagram illustrating a snapshot hyperspectral camera system 600, in accordance with another embodiment of the disclosure. System 600 is similar to system 400 except that focusing lens 415 is omitted and image sensor 140 is substantially aligned with the focal plane 180 of lenslet array 120. This design is even more compact than system 400, but may include modifications to conventional camera systems to get image sensor 140 sufficiently close to lenslet array 120. For example, the camera shutter and/or sensor window may be removed to move image sensor 140 sufficiently close to lenslet array 120.

Unlike conventional hyperspectral imaging techniques, the embodiments described above use relatively low-cost components to obtain a hyperspectral image in a single camera exposure, with high photon detection efficiency. This approach is scalable to larger image sizes, limited by the size of available image sensors or image sensor mosaics. The number of pixels on the image sensor is $N_x*N_y*N_\lambda/Nf$, where $N_x$, $N_y$, and $N_\lambda$ are the lengths of the reconstructed hyperspectral datacube along the horizontal, vertical, and wavelength axes, respectively, and Nf~0.25-0.5 is a factor that accounts for how efficiently the spectrum stripes fill the sensor area. Thus, for example, a 50 Mp image sensor can generate a 500×500×50 pixel datacube at Nf=0.25. For large sensors, the time required for readout and image processing can become a limitation on data throughput. To increase throughput, the hyperspectral image reconstruction, and subsequent processing, such as spectral unmixing, can be moved to hardware. This reduces the quantity of data that must be transferred to a computer or to storage. The hyperspectral image reconstruction and spectral unmixing could also be combined into a single step, using an interpolation matrix to map the raw snapshot image in (x', y') coordinates to a processed hyperspectral image in (x, y, h) coordinates, where h indexes a set of fluorophores, rather than wavelength.

The processes explained above are described in terms of computer software and hardware. The techniques described may constitute machine-executable instructions embodied within a tangible or non-transitory machine (e.g., computer) readable storage medium, that when executed by a machine (e.g., controller 145) will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A hyperspectral camera system, comprising:
   an input optical assembly that magnifies an image of a sample and focuses the image onto an image plane;
   a lenslet array positioned approximately at the image plane of the input optical assembly, wherein the lenslet array includes a two-dimensional ("2D") array of microlenses that concentrate the image into an array of image portions, wherein each of the image portions has a smaller area than a corresponding one of the microlenses and the image portions are at least partially separated from each other by interstitial regions;
   a dispersion element disposed in an optical path of the image to spatially disperse different spectral components in each of the image portions to generate spectrum stripes that spatially spread the different spectral components of the image sourced from a single sample location within the sample; and
   an image sensor positioned to capture a snapshot image of the spectrum stripes,
   wherein the dispersion element is oriented to cause dispersion along a dispersion axis and wherein columns and rows of the 2D array of microlenses are obliquely rotated relative to the dispersion axis.

2. The hyperspectral camera system of claim 1, wherein the dispersion axis is aligned parallel to horizontal rows of image pixels in the image sensor.

3. The hyperspectral camera system of claim 1, wherein the input optical assembly comprises:
   an objective lens positioned to magnify and collimate an image of a sample; and
   a first focusing lens aligned relative to the object lens to focus the image output from the objective lens onto the image plane.

4. The hyperspectral camera system of claim 1, wherein the microlenses of the 2D array of microlenses each have a size that ranges between one quarter and four times of a diffraction limited spot size of the input optical assembly.

5. The hyperspectral camera system of claim 1, wherein the microlenses of the 2D array of microlenses each have square perimeter shapes with substantially no gaps between adjacent ones of the microlenses.

6. The hyperspectral camera system of claim 1, wherein the lenslet array comprises a subgroup of microlenses that repeats across the lenslet array on a single plane and wherein one or more of the microlenses within the subgroup are shaped for off-axis lensing to rearrange the spectrum stripes onto the image sensor into a first layout pattern that is different than a second layout pattern of the microlenses within the subgroup.

7. The hyperspectral camera system of claim 1, further comprising a controller coupled to the image sensor, the controller including logic that when executed by the controller causes the controller to perform operations including:
   generating initial spectral functions describing spectral content for the spectrum stripes;
   applying cross-talk coefficients to the initial spectral functions to offset cross-talk from adjacent spectrum stripes for each of the spectrum stripes;
   generating revised spectral functions for the spectrum stripes after applying the cross-talk coefficients; and
   iterating the applying of the cross-talk coefficients and the generating of the revised spectral functions to generate a refined hyperspectral image of the sample with reduced cross-talk.

8. The hyperspectral camera system of claim 1, further comprising a controller coupled to the image sensor, the controller including logic that when executed by the controller causes the controller to perform operations including:
   generating one or more cross-talk correction matrices for each of the spectrum stripes, wherein each of the cross-talk correction matrices includes coefficients for offsetting cross-talk contributions from adjacent spectrum stripes; and
   applying the cross-talk correction matrices to each of the spectrum stripes to generate a refined hyperspectral image of the sample with reduced cross-talk.

9. The hyperspectral camera system of claim 1, further comprising:
   a collimating lens assembly positioned between the lenslet array and the dispersion element to collimate the array of image portions prior to dispersion, wherein a first focal plane of the collimating lens assembly is substantially aligned to a second focal plane of the lenslet array; and
   a focusing lens assembly positioned between the dispersion element and the image sensor to focus the spectrum stripes onto the image sensor.

10. The hyperspectral camera system of claim 1, wherein the dispersion element comprises a diffraction grating, the hyperspectral camera system further comprising:
a prism array disposed in the optical path, wherein the prism array bends light of the image output from the input optical assembly by a first angle such that a design wavelength dispersed by the diffraction grating and bent by the prism array propagates along a trajectory that is substantially normal to the image plane.

11. The hyperspectral camera system of claim 10, wherein the prism array comprises a one-dimensional (1D) array of prisms with each of the prisms within the 1D array of prisms aligned parallel to a line of the microlenses within the 2D array of microlenses.

12. The hyperspectral camera system of claim 10, further comprising:
a second focusing lens having a third focal plane substantially aligned to a second focal plane of the lenslet array to reimage the spectrum stripes onto the image sensor.

13. The hyperspectral camera system of claim 10, wherein the image sensor is substantially aligned with a second focal plane of the lenslet array.

14. A method of generating a hyperspectral image, comprising:
magnifying an image of a sample onto an image plane;
concentrating the image at the image plane with a lenslet array into an array of image portions, wherein each of the image portions has a smaller area than a corresponding microlens of the lenslet array and the image portions are at least partially separated from each other by interstitial regions;
dispersing spectral components in each of the image portions with a dispersion element to generate spectrum stripes that spatially spread different spectral components of the image sourced from a single sample location within the sample; and
capturing a snapshot image of the spectrum stripes with an image sensor,
wherein dispersing the spectral components in each of the image portions comprises dispersing the spectral components along a dispersion axis that is obliquely orientated relative to columns and rows of the 2D array of microlenses.

15. The method of claim 14, wherein the dispersion axis is aligned parallel to horizontal rows of image pixels in the image sensor.

16. The method of claim 14, wherein concentrating the image at the image plane with the lenslet array into the array of image portions comprises:
off-axis lensing of the image at the image plane; and
rearranging the spectrum stripes, via the off-axis lensing at the image plane, onto the image sensor into a first layout pattern that is different than a second layout pattern of the microlenses at the image plane.

17. The method of claim 14, further comprising:
generating initial spectral functions describing spectral content for the spectrum stripes;
applying cross-talk coefficients to the initial spectral functions to offset cross-talk from adjacent spectrum stripes for each of the spectrum stripes;
generating revised spectral functions for the spectrum stripes after applying the cross-talk coefficients; and
iterating the applying of the cross-talk coefficients and the generating of the revised spectral functions to generate a refined hyperspectral image of the sample with reduced cross-talk.

18. The method of claim 14, further comprising:
generating one or more cross-talk correction matrices for each of the spectrum stripes, wherein each of the cross-talk correction matrices includes coefficients for offsetting cross-talk contributions from adjacent spectrum stripes; and
applying the cross-talk correction matrices to each of the spectrum stripes to generate a refined hyperspectral image of the sample with reduced cross-talk.

19. The method of claim 14, further comprising:
collimating the array of image portions prior to dispersion with a collimating lens assembly, wherein a first focal plane of the collimating lens assembly is substantially aligned to a second focal plane of the lenslet array; and
focusing the spectrum stripes onto the image sensor with a focusing lens assembly positioned between the dispersion element and the image sensor.

20. The method of claim 14, wherein the dispersion element comprises a diffraction grating disposed in an optical path of the image, the method further comprising:
bending light rays of the image with a prism array, wherein the light rays are bent by a first angle such that a design wavelength dispersed by the diffraction grating propagates along a trajectory that is substantially normal to the image plane after the light rays pass through the diffraction grating and the prism array.

21. The method of claim 20, further comprising:
reimaging the spectrum stripes on the image sensor with a focusing lens having a third focal plane substantially aligned to a second focal plane of the lenslet array.

22. The method of claim 20, wherein the image sensor is substantially aligned with a second focal plane of the lenslet array.

23. A hyperspectral camera system, comprising:
an input optical assembly that magnifies an image of a sample and focuses the image onto an image plane;
a lenslet array positioned approximately at the image plane of the input optical assembly, wherein the lenslet array includes a two-dimensional ("2D") array of microlenses that concentrate the image into an array of image portions, wherein each of the image portions has a smaller area than a corresponding one of the microlenses and the image portions are at least partially separated from each other by interstitial regions;
a dispersion element disposed in an optical path of the image to spatially disperse different spectral components in each of the image portions to generate spectrum stripes that spatially spread the different spectral components of the image sourced from a single sample location within the sample;
an image sensor positioned to capture a snapshot image of the spectrum stripes; and
a controller coupled to the image sensor, the controller including logic that when executed by the controller causes the controller to perform operations including:
generating initial spectral functions describing spectral content for the spectrum stripes;
applying cross-talk coefficients to the initial spectral functions to offset cross-talk from adjacent spectrum stripes for each of the spectrum stripes;
generating revised spectral functions for the spectrum stripes after applying the cross-talk coefficients; and
iterating the applying of the cross-talk coefficients and the generating of the revised spectral functions to generate a refined hyperspectral image of the sample with reduced cross-talk.

24. A hyperspectral camera system, comprising:
an input optical assembly that magnifies an image of a sample and focuses the image onto an image plane;
a lenslet array positioned approximately at the image plane of the input optical assembly, wherein the lenslet array includes a two-dimensional ("2D") array of microlenses that concentrate the image into an array of image portions, wherein each of the image portions has a smaller area than a corresponding one of the microlenses and the image portions are at least partially separated from each other by interstitial regions;
a dispersion element disposed in an optical path of the image to spatially disperse different spectral components in each of the image portions to generate spectrum stripes that spatially spread the different spectral components of the image sourced from a single sample location within the sample;
an image sensor positioned to capture a snapshot image of the spectrum stripes; and
a controller coupled to the image sensor, the controller including logic that when executed by the controller causes the controller to perform operations including:
generating one or more cross-talk correction matrices for each of the spectrum stripes, wherein each of the cross-talk correction matrices includes coefficients for offsetting cross-talk contributions from adjacent spectrum stripes; and
applying the cross-talk correction matrices to each of the spectrum stripes to generate a refined hyperspectral image of the sample with reduced cross-talk.

25. A method of generating a hyperspectral image, comprising:
magnifying an image of a sample onto an image plane;
concentrating the image at the image plane with a lenslet array into an array of image portions, wherein each of the image portions has a smaller area than a corresponding microlens of the lenslet array and the image portions are at least partially separated from each other by interstitial regions;
dispersing spectral components in each of the image portions with a dispersion element to generate spectrum stripes that spatially spread different spectral components of the image sourced from a single sample location within the sample;
capturing a snapshot image of the spectrum stripes with an image sensor;
generating one or more cross-talk correction matrices for each of the spectrum stripes, wherein each of the cross-talk correction matrices includes coefficients for offsetting cross-talk contributions from adjacent spectrum stripes; and
applying the cross-talk correction matrices to each of the spectrum stripes to generate a refined hyperspectral image of the sample with reduced cross-talk.

* * * * *